US010582658B2

(12) United States Patent
Ricketts et al.

(10) Patent No.: US 10,582,658 B2
(45) Date of Patent: Mar. 10, 2020

(54) LIGHT BEAM HEADER HEIGHT CONTROL SYSTEM FOR AN AGRICULTURAL HARVESTER

(71) Applicant: CNH Industrial America LLC, New Holland, PA (US)

(72) Inventors: Jonathan Eugene Ricketts, Coal Valley, IL (US); John Conroy, Ephrata, PA (US)

(*) Notice: Subject to any disclaimer, the term of this patent is extended or adjusted under 35 U.S.C. 154(b) by 0 days.

(21) Appl. No.: 15/289,514

(22) Filed: Oct. 10, 2016

(65) Prior Publication Data

US 2017/0020065 A1    Jan. 26, 2017

Related U.S. Application Data

(62) Division of application No. 14/155,715, filed on Jan. 15, 2014, now abandoned.

(51) Int. Cl.
*A01D 41/14* (2006.01)
*A01D 34/00* (2006.01)
*A01D 34/03* (2006.01)
*A01D 101/00* (2006.01)

(52) U.S. Cl.
CPC .......... *A01D 34/008* (2013.01); *A01D 34/03* (2013.01); *A01D 41/141* (2013.01); *A01D 2101/00* (2013.01)

(58) Field of Classification Search
CPC ...... A01D 34/008; A01D 34/03; A01D 41/00; A01D 41/14; A01D 41/141; A01D 41/145; A01D 2101/00

USPC ................ 56/10.2 E, 10.2 R; 172/307, 624.5
See application file for complete search history.

(56) References Cited

U.S. PATENT DOCUMENTS

| 3,886,718 | A | * | 6/1975 | Talbot | A01D 41/141 |
| | | | | | 56/10.2 E |
| 3,967,437 | A | * | 7/1976 | Mott | A01D 41/14 |
| | | | | | 116/282 |
| 4,009,555 | A | * | 3/1977 | Temple | A01D 41/141 |
| | | | | | 56/10.2 E |
| 4,594,840 | A | * | 6/1986 | D'Almeida | A01D 41/145 |
| | | | | | 56/11.2 |
| 4,776,153 | A | * | 10/1988 | DePauw | A01D 41/145 |
| | | | | | 56/10.2 E |
| 5,155,984 | A | | 10/1992 | Sheehan | |

(Continued)

*Primary Examiner* — Alicia Torres
*Assistant Examiner* — Adam J Behrens
(74) *Attorney, Agent, or Firm* — Peter K. Zacharias; Patrick M. Sheldrake

(57) ABSTRACT

An improved automatic height adjustment system for use with a header of an agricultural harvester is provided. The system includes apparatus and methods utilizing detection of a light beam at or near the skid plate of a header to adjust the height of the header relative to the ground surface. The apparatus includes an emitter for emitting a beam of light to a receiver. An apertured sensor guide is positioned between the emitter and the receiver. The sensor guide is in communication with a controller. If the body of the sensor guide is detected as blocking passage of light to the receiver then the controller operates an extensible actuator to raise or lower the header relative to the ground surface. The system provides rapid header height adjustment in response to detected changes in elevation of the skid plate as the harvester traverses a crop field.

24 Claims, 4 Drawing Sheets

(56) References Cited

U.S. PATENT DOCUMENTS

| | | | |
|---|---|---|---|
| 5,713,190 A * | 2/1998 | Vermeulen | A01D 41/141 56/10.2 E |
| 5,937,621 A | 8/1999 | Eggenhaus | |
| 5,984,420 A | 11/1999 | Murray et al. | |
| 6,389,785 B1 | 5/2002 | Diekhans et al. | |
| 6,615,570 B2 | 9/2003 | Beck et al. | |
| 6,758,029 B2 | 7/2004 | Beaujot | |
| 6,791,488 B2 | 9/2004 | Diekhans et al. | |
| 6,813,873 B2 | 11/2004 | Allworden et al. | |
| 6,826,894 B2 | 12/2004 | Thiemann et al. | |
| 7,222,474 B2 | 5/2007 | Rayfield et al. | |
| 7,540,130 B2 * | 6/2009 | Coers | A01D 41/141 56/10.2 E |
| 8,151,547 B2 | 4/2012 | Bich et al. | |
| 8,359,822 B2 | 1/2013 | Honas et al. | |
| 9,980,431 B2 * | 5/2018 | Long | A01D 34/006 |
| 2002/0014059 A1 | 2/2002 | Lely et al. | |
| 2004/0040276 A1 * | 3/2004 | Allworden | A01D 41/141 56/10.2 R |
| 2006/0242935 A1 * | 11/2006 | Rayfield | A01D 41/141 56/10.2 E |
| 2008/0264025 A1 * | 10/2008 | Ditchcreek | A01D 41/141 56/10.2 E |

* cited by examiner

LIGHT BEAM HEADER HEIGHT CONTROL SYSTEM FOR AN AGRICULTURAL HARVESTER

BACKGROUND

The subject application relates generally to headers for agricultural harvesters. In particular, the subject application relates to an improved automatic header height control system.

Agricultural harvesters such as combine harvesters are well known apparatuses for harvesting grain crops. An agricultural harvester is typically a self-propelled vehicle which includes a feederhouse and mechanisms downstream of the feederhouse for separating grain from other crop material. A header is attached to the front of the harvester and includes mechanisms for cutting crop, gathering crop and delivering crop to the harvester's feederhouse. A typical crop cutter includes knives which shears crop near the ground. After cutting, the crop is gathered e.g., by a harvesting reel which feeds the cut crop to a conveyor system that transports the cut crop to the harvester's feederhouse.

As an agricultural harvester passes over the ground surface, it oftentimes encounters substantial changes in topography. Such changes in land topography can damage the crop cutter which is positioned close to the ground surface.

To address these issues with changing land topography, conventional headers employ height control systems which often include an elaborate array of skid plates, feeler arms, support arms and mechanical sensing mechanisms that must work in concert in order to provide reliable header height adjustment. For example, a typical header includes a chassis and skid plates which extend the entire length of the chassis. Several feeler arms and support arms are spaced along the chassis in the direction of travel of the harvester. As the harvester traverses the ground, the support arms may encounter changes in the underlying ground topography. As the support arms come across such relatively higher and lower spots, they alternately raise and lower the feeler arms. Thus, when a support arm comes into contact with a raised ground portion, such as a mound or the like it pushes up against and raises its associated feeler arm, and when it encounters a depression in the ground it lowers the feeler arm. In conventional mechanical header height adjustment systems, sufficient displacement of any of the feeler arms either upwardly or downwardly produces a corresponding motion in a respective left or right electromechanical sensor mechanism which, in turn, causes hydraulic header adjustment cylinders in communication with the sensor mechanisms to raise, lower or tilt the header chassis whereby it can accommodate the change in ground contour.

In addition to the overall complexity of conventional mechanical header height control systems, the electromechanical sensor mechanisms of such systems are typically constructed as a complicated array of levers, tie rods, springs and sensors which must be continually recalibrated for optimum header height adjustment performance. Such repeated adjustment can be time consuming, especially in regions where the fields being harvested possess many prominent topographical irregularities. Moreover, manual adjustment of the many movable sensor components does not always translate into reliable sensor performance. That is, the precision of the electromechanical sensor mechanism depends in large part on the skill and experience of the individual making the adjustments to the several components of the mechanism, which can vary considerably from person to person.

Still further, the feeler rods of conventional automatic header height control systems are typically disposed more than a foot, even up to 18+ inches, behind the crop cutter. A disadvantage of such spacing is that there is a delay from the time the skid plates encounter a dip or rise in the ground surface and such irregularity is detected by the feeler rod. As a consequence, the crop cutter may suffer damage as a result of its blades impacting and/or becoming immersed in soil if there is a sudden rise in the ground surface. Conversely, if there is a substantial drop in the ground surface level, the cutter may sever less crop than it otherwise should in order to maximize crop yield.

BRIEF SUMMARY

The subject application provides an automatic height control system for use with a header of an agricultural harvester. The system includes apparatus and methods for addressing the problems of electromechanical sensor accuracy and undue design complexity by virtue of a robust yet simple construction. Automatic header height control is achieved via a light beam emitter and a light beam receiver or sensor which detects light transmitted by the emitter. At least one apertured sensor guide is disposed between the light emitter and receiver. The sensor guide(s) communicate with one or more controllers which, in turn, operate extensible actuators that adjust the height and/or tilt of the header relative to the ground surface. Depending on the vertical position of the sensor guide, which is dictated by the elevation of a header skid plate in contact with the ground surface, the sensor guide either allows or blocks passage of the light beam from the emitter to the receiver. When the sensor guide blocks passage of the light beam to the receiver, the sensor guide communicates the light blockage to a controller which causes the extensible actuators to raise, lower or tilt the header in such manner as to accommodate the change in ground topography.

In addition, unlike electromechanical sensor mechanisms, the positions of the emitter and receiver require little to no user adjustment. Moreover, with the sensor guide(s) and receiver being located on or closely adjacent to the skid plate rather than rearwardly thereof, there is little lapse in time from when the skid plate experiences a change in topography and the controller instructs the extensible actuators(s) to make an appropriate change in elevation and/or tilt of the header. Therefore, there is less likelihood that the cutter bar would contact soil and experience possible damage or result in a less than optimal cut of the crop to optimize crop recovery.

In accordance with a first aspect, the subject application provides an apparatus for controlling a distance between a front end of a header of an agricultural harvester and a ground surface. The apparatus includes an emitter for emitting a light beam adjacent to a skid plate mounted on a header chassis and disposed adjacent to a cutter bar assembly carried by the header chassis. The skid plate extends in a widthwise direction of the header chassis defining a longitudinal axis and is moveable between a first position and a second position relative to the header chassis. The apparatus further includes a sensor guide connected to the skid plate. The sensor guide includes an aperture for allowing the passage of the light beam through the aperture when the skid plate is in the first position and a body for blocking the passage of the light beam when the skid plate is in the second position. A controller is in communication with the sensor guide and configured to adjust the elevation of the header relative to the ground surface based upon a response received from the sensor guide.

In accordance with a second aspect, the subject application provides a header for an agricultural harvester. The apparatus includes a header chassis mountable on a harvester with the front end of the header carried by the header chassis. A skid plate is mounted on the header chassis and is disposed adjacent to the front end. The skid plate extends in a widthwise direction of the header chassis and defines a longitudinal axis. The skid plate is moveable between a first position and a second position relative to the header chassis. The apparatus further includes an emitter for emitting a light beam adjacent to the skid plate and a sensor guide connected to the skid plate. The sensor guide has an aperture for allowing the passage of the light beam through the aperture when the skid plate is in the first position and for blocking the passage of the light beam through the aperture when the skid plate is in the second position. A controller is in communication with the sensor guide and configured to adjust the elevation of the header relative to a ground surface based upon a response received from the sensor guide.

In accordance with a third aspect, the subject application provides a header for an agricultural harvester. The apparatus includes a header chassis mountable on a harvester and a cutter bar assembly carried by the header chassis. A skid plate is mounted on the header chassis and is disposed adjacent to the cutter bar assembly. The skid plate extends in a widthwise direction of the header chassis and defines a longitudinal axis. The skid plate is moveable between a first position and a second position relative to the header chassis. The apparatus further includes a support bar having a first end pivotably connected to the header chassis and a second end opposite the first end connected to the skid plate. Furthermore, the apparatus includes an emitter for emitting a light beam adjacent to the support bar and a receiver mounted on the support bar for receiving the light beam. A controller is in communication with the receiver and configured to adjust the elevation of the header relative to a ground surface based upon a response received from the receiver.

In accordance with a fourth aspect, the subject application provides a method for controlling a distance between a front end of a header of an agricultural harvester and a ground surface. The method includes providing a sensor guide having a body and an aperture through the body for mounting on a skid plate connected adjacent the front end of the header. A light beam is emitted adjacent to the skid plate for passage through the aperture of the sensor guide when the skid plate is in a non-biased position. The method further includes sensing if the body detects the presence of the light beam when the skid plate is biased as the harvester travels along the ground surface and adjusting the elevation of the header in response to the sensor guide body sensing the presence of the light beam as the harvester travels along the ground surface.

BRIEF DESCRIPTION OF THE SEVERAL VIEWS OF THE DRAWINGS

The foregoing summary, as well as the following detailed description of several aspects of the subject application, will be better understood when read in conjunction with the appended drawings. For the purpose of illustrating the subject application there are shown in the drawings several aspects, but it should be understood that the subject application is not limited to the precise arrangements and instrumentalities shown.

In the drawings.

DETAILED DESCRIPTION

Reference will now be made in detail to the various aspects of the subject application illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, left, right, above, below and diagonal, are used with respect to the accompanying drawings. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

Figure 1:
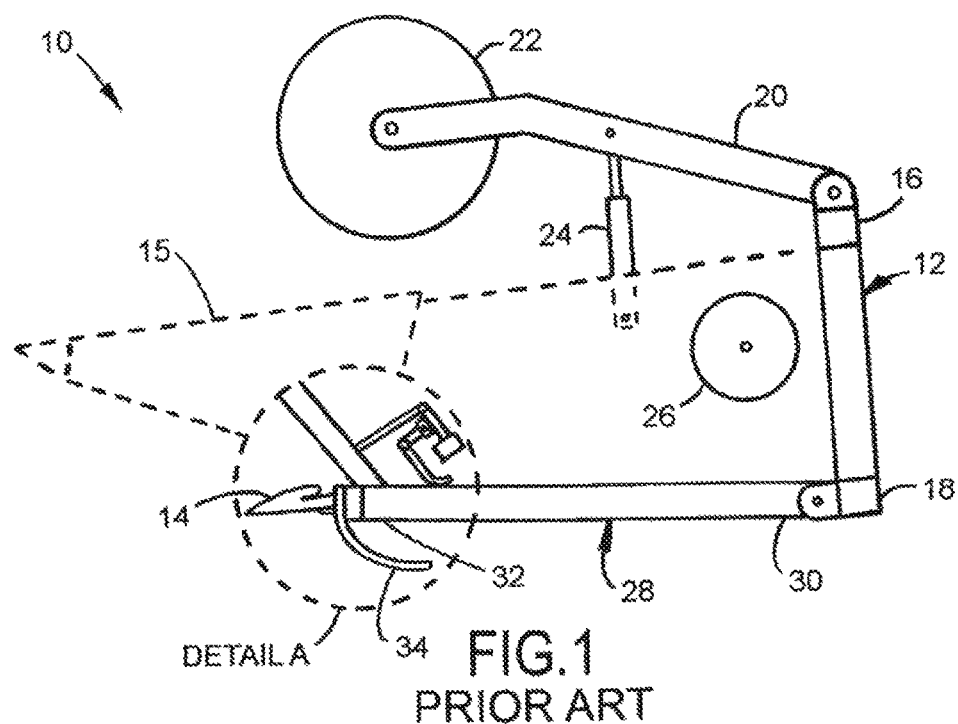
FIG. 1 is a partial schematic side elevation view of a conventional agricultural harvester header with certain elements omitted or shown in phantom line for clarity of illustration.

Referring now to the drawings, wherein aspects of the subject application are shown, FIG. 1 illustrates a header 10 which is mountable to a forward end of an unillustrated agricultural harvester, such as a combine. The header 10 is configured to cut crops and to induct the cut crops into a harvester feederhouse as the harvester moves forward over a crop field.

Header 10 includes a frame or chassis 12 to which is attached an unillustrated floor that is supported in desired proximity to the surface of a crop field and an elongate cutter bar or sickle assembly 14 that extends along a forward edge of the floor. Cutter bar assembly 14 is configured to cut crops in preparation for induction into the feederhouse. Cutter bar assembly 14 can be configured to include a first movable knife assembly and a second movable knife assembly (along with an unillustrated stationary knife). Such knife assemblies are known in the art and a typical assembly applicable to the subject application is disclosed in U.S. Pat. No. 8,151,547, the entire disclosure of which is incorporated by reference herein. An end divider is shown in dashed line as indicated by reference numeral 15. As is known, such an end divider serves to direct crop towards the cutter bar assembly 14.

An exemplary header chassis 12 can include an upper end 16 and a lower end 18. A plurality of harvesting reel support arms 20 (one of which is shown in FIG. 1) are pivotably connected to the upper end 16 of the header chassis 12. At their distal ends support arms 20 rotatably carry a harvesting reel 22. The harvesting reel 22 is an elongate, transversely extending reel disposed above cutter bar assembly 14. A hydraulic cylinder or similar extensible actuator 24 can be used to raise and lower the harvesting reel 22 relative to the cutter bar assembly 14 based on such factors as the type, height and density of crop being harvested. Harvesting reel 22 is rotatable in a direction suitable for facilitating the induction of cut crops into the harvester feederhouse. Header 10 further includes an elongate, rotatable auger 26 or other conveyor which extends in close proximity to the header floor. Auger 26 is configured to cooperate with harvesting reel 22 in delivering cut crops to the feederhouse, which is configured to convey the cut crops into the harvester for threshing and cleaning.

A plurality of flex arms or support bars 28 (one of which is shown in FIG. 1) are connected to the lower end 18 of header chassis 12. More particularly, the support bars 28 have first or proximal ends 30 which can be pivotably connected to the lower end 18 of the header chassis. The support bars additionally have second or distal ends 32 which can carry a skid plate 34 (FIGS. 1 and 2) that contacts the ground surface of a field being harvested. Skid plate 34 extends in a widthwise direction of the header chassis defining a longitudinal axis and is moveable between first and second positions relative to the header chassis. Skid plate 34 is typically constructed as a plurality of independently moveable skid plate segments.

Figure 2:
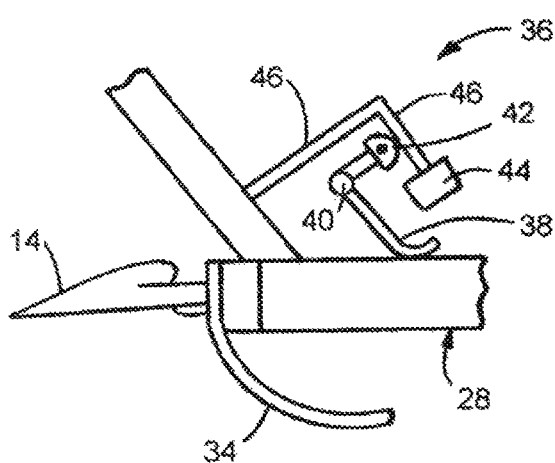
FIG. 2 is an enlarged view of detail A of FIG. 1.
Figure 3:
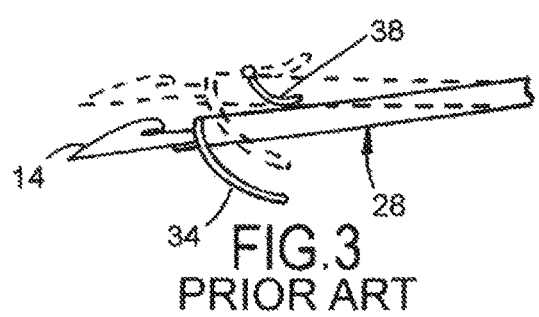
FIG. 3 is a side elevation view of a support bar and feeler arm of a conventional agricultural harvester in lowered and raised positions.

FIG. 2 demonstrates the relationship between an electromechanical sensor mechanism, identified generally by reference numeral 36, and the support bars 28. The electromechanical sensor mechanism 36 is typically located on each width end of the header 10 and is operable to effectuate raising and lowering of a respective end of the header based on changes in ground surface elevation experienced by the skid plate 34. As seen in FIG. 2, a moveable feeler arm 38 is shown in contact with an upper surface of support bar 28. A separate feeler arm 38 may be associated with each support bar of the header, if more than one, or only certain ones of the support bars. Depending on the elevation of support bar 28 at its point of contact with feeler arm 38, the electromechanical sensor mechanism may cause unillustrated hydraulic cylinders or similar extensible actuators to raise, lower or tilt the header in the manner known in the art. Referring to FIG. 3, the support bar 28 is shown in a relatively lowered position (solid line) and a raised position (dashed line). The range of travel of the contact point between a flex arm or support bar 28 and its associated feeler arm is typically about six inches, but can be more or less than six inches, although changes in header height are often calibrated to occur when a support bar moves its associated feeler arm from about one to two inches from its previous position.

Referring again to FIG. 2, the feeler arms 38 are mounted to a pivot shaft 40 whereby upward movement of one or more of the support bars 28 causes the associated feeler arm(s) 38 to swing upwardly, whereas downward movement of one or more of the support bars 28 causes the associated feeler arm(s) 38 to swing downwardly. Typically, at least one feeler arm is associated with a central height control sensor 42 and at least one other feeler arm is associated with an end height control sensor 44. While not shown in detail in FIG. 2, the electromechanical sensor mechanism 36 normally includes a number of linkages and adjustable tie rods, shown generally by reference numeral 46, which must be periodically adjusted in order to maintain the accuracy of the electromechanical sensor mechanism. Such adjustment is made by hand and its precision is dependent on the skill and experience of the operator making the adjustment.

Furthermore, the points at which the feeler arms 38 contact the support bars or flex arms 28 typically lie more than a foot to as much as 18+ inches behind the cutter bar assembly 14. As a consequence, there is a noticeable lag between the time the skid plate experiences a fall or rise in ground elevation and the time that the electromechanical sensor mechanism 36 instructs the extensible actuators to take corrective action to raise, lower or tilt the header. Such lag time can result in the cutter bar assembly impacting and/or becoming immersed in soil or cutting off less crop than it otherwise should.

Figure 4:
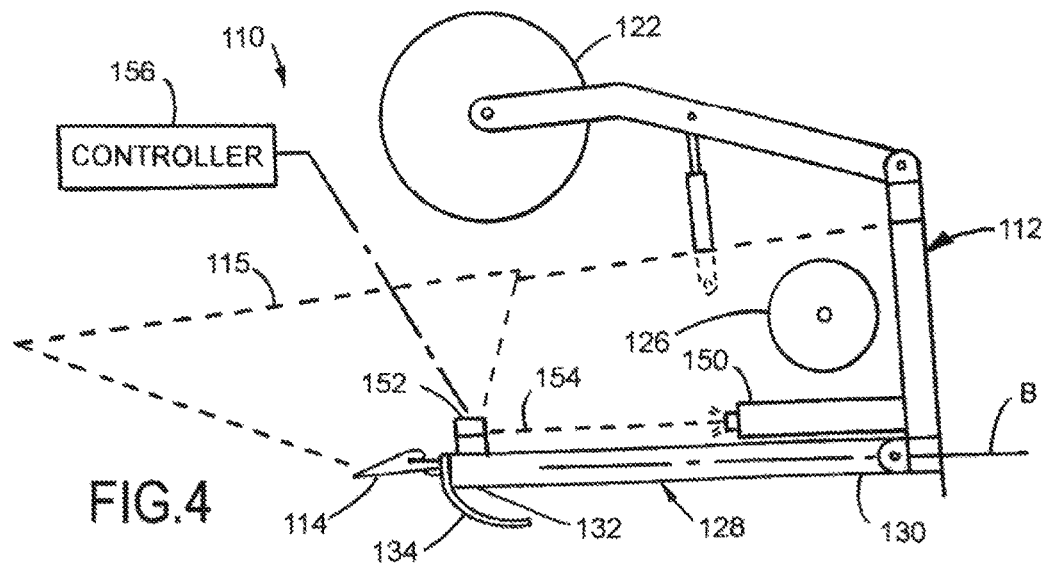
FIG. 4 is side elevation view of an agricultural harvester header in accordance with an aspect of the subject application with certain elements omitted or shown in phantom line for clarity of illustration.

Turning to FIG. 4, there is shown an apparatus including an agricultural harvester header 110 constructed in accordance with an aspect of the subject application. Header 110 possesses certain structural elements in common with header 10 of FIG. 1 including, without limitation, a frame or chassis 112 mountable on the harvester, a cutter bar assembly 114 carried by the header chassis, an end divider 115, a harvesting reel 122, and an auger 126. As such, those components will not be described in further detail except where necessary for a proper understanding of the subject application.

As seen in FIG. 4, the front end of the header 110 is carried by the header chassis 112. The header 110 in combination with a controller 156, further described below, functions as an apparatus for controlling a distance between the front end of the header and the ground surface. The apparatus i.e., an automatic header height adjustment system includes at least one emitter 150 for emitting a light beam and at least one receiver 152 for receiving the light beam emitted by the emitter. The emitter 150 can be a laser light emitter which emits a beam 154 of laser light toward the receiver 152. It will be understood, however, that emitter 150 can be configured to emit other forms of light and receiver 152 can receive other forms of light. Exemplary receivers 152 can include e.g., prism receivers.

Header 110 also includes a plurality of support bars 128 (only one of which is shown in FIG. 4), each having a first end 130 pivotably connected to the header chassis and a second end 132 opposite the first end connected to the skid plate 134. Skid plate 134 is mounted on the header chassis and disposed adjacent to the cutter bar assembly 114. The skid plate extends in a widthwise direction of the header chassis defining a longitudinal axis (reference "A" in FIGS. 5 and 6), and is moveable between a first position and a second position relative to the header chassis. For example, the front end of the skid plate is rigidly attached to the header chassis and/or cutter bar assembly 114 and the back end is configured to flex relative to the front end.

In one example, the emitter 150 is mounted on the header chassis 112 proximate the first end of support bar 128 and the receiver 152 is mounted to the support bar at a location proximate the second end thereof. The light beam from the emitter is emitted adjacent to and substantially parallel to a longitudinal axis "B" of the support bar 128, as shown, for example, in FIG. 4.

In operation, as the second or distal end 132 of the support bar 128 moves upwardly and downwardly in response to the changes in ground surface contour experienced by the skid plate 134, the receiver 152 correspondingly moves upwardly and downwardly. As a result, the receiver 152 moves into and out of alignment with the light beam 154 and receives the light beam at various angles of inclination. As this occurs, a controller 156 in communication with the receiver 152 is configured to adjust the elevation of the header relative to the ground based upon a response received from the receiver, such as by controlling unillustrated extensible actuator(s).

In addition, while shown in FIG. 4 as being a single emitter-receiver tandem, it will be understood that several such arrangements may be provided along the widthwise length of the skid plate. Indeed, it is contemplated that an emitter-receiver tandem may be provided for each skid plate segment, every other segment, every third segment, and so on, which segments are described below in respect to FIG. 6. Still further, while shown with the light beam 154 being emitted in the fore and aft direction of the header, it is also contemplated that the emitter 150 can be fixedly mounted so that it emits a light beam substantially parallel to the longitudinal axis of the skid plate and the receiver 152 mounted on a support bar in alignment with the emitter. In such case, the emitter would emit the light beam adjacent to and substantially parallel to the longitudinal axis of the skid plate. Additionally, for optimum sensitivity the receiver would be mounted proximate the second end of the support bar and the emitter would be mounted in alignment proximate the second end of the support bar. Then, when the skid plate moves as a result of encountering ground surface contours, the receiver receives the light beam at different angles and there after induces the controller to adjust the height of the header.

Figure 5:
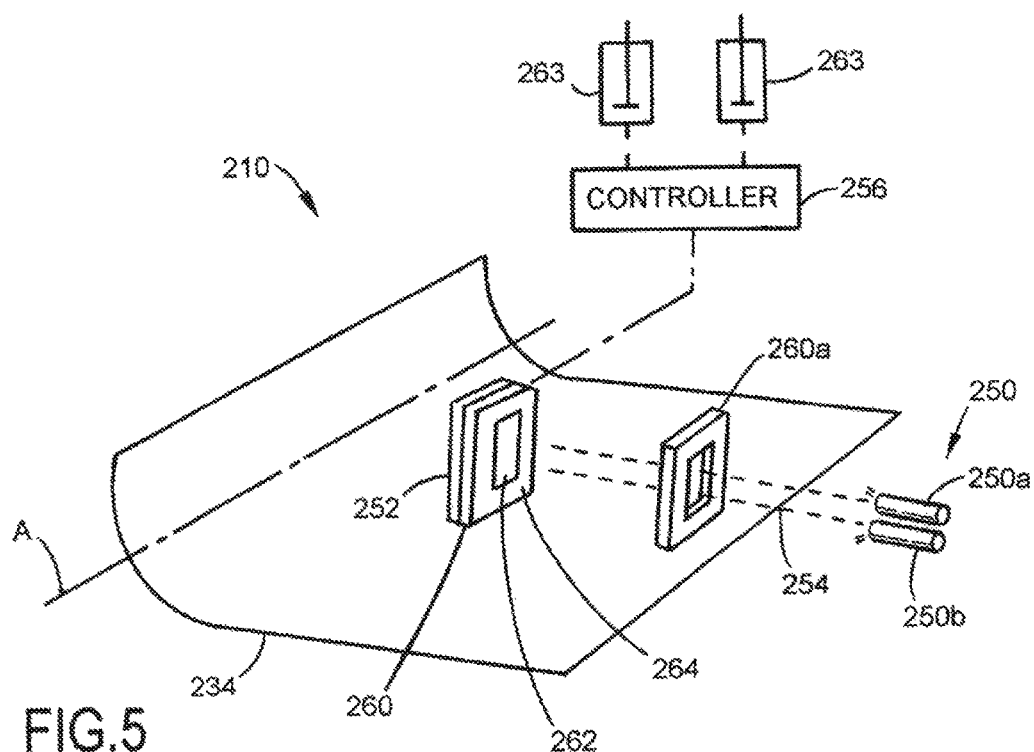
FIG. 5 is a perspective view of a portion of an agricultural harvester header in accordance with another aspect of the subject application.

FIG. 5 reveals a further aspect of the subject application, in particular a partial view of an apparatus including an agricultural harvester header 210. According to this aspect, the emitter 250 is constructed as a pair of emitters 250a, 250b which are mounted to unillustrated header structure, such as a chassis. The emitters emit light beams 254 adjacent to the skid plate in the direction of travel of the harvester, i.e., in the fore and aft direction of the header or perpendicular to a longitudinal axis A of the skid plate 234. A receiver 252 is mounted on the skid plate and receives the light beams 254 passing through an aperture 262 of a sensor guide 260, as further discussed below. It will be understood, however, that emitter 250 can be a single emitter that emits a light beam adjacent to the skid plate substantially perpendicular to the longitudinal axis A and receiver 252 receives the light beam passing through the aperture 262 of sensor guide 260.

Unlike header 110, the receiver 252 of header 210 is mounted on the skid plate 234. The sensor guide 260 is connected to the skid plate and disposed between the emitters 250a, 250b and the receiver 252. Sensor guide 260 communicates with a controller 256 which, in turn, operates one or more extensible actuators 263 in order to adjust the height of header 210 based on fluctuations in ground height detected by the sensor guide 260 as the harvester traverses a field. Header 210 includes an unillustrated header chassis which is mountable on a harvester. Such a chassis can assume any suitable configuration, including those schematically depicted in FIGS. 1 and 4. The cutter bar assembly 214 and skid plate 234 are carried by the header chassis in the manner described above in connection with FIGS. 1 and 4. For example, skid plate 234 is mounted on the header chassis and disposed adjacent to the cutter bar assembly 214. The skid plate extends in a widthwise direction of the header chassis and defines a longitudinal axis A. The skid plate 234 is moveable between a first non-biased position and a second biased position relative to the header chassis. For example, the skid plate is in a non-biased position when it does not come in contact with a ground surface and is in a biased position when the skid plate contacts the ground surface.

Aperture 262 of sensor guide 260 faces in the fore and aft direction of the header, i.e., perpendicular to longitudinal axis A, and allows the passage of the light beams through the aperture when the skid plate is in the first non-biased position. Sensor guide 260 further includes a body 264 for blocking the passage of the light beams when the skid plate is in the second position. As noted above, the controller 256 is in communication with the sensor guide 260 and configured to adjust the elevation of the header 210 relative to the ground surface based upon a response received from the sensor guide. The provision of first and second emitters 250a, 250b enhances the sensitivity of the height adjustment apparatus in the sense that emitter 250a can emit a light beam operable to strike the sensor guide 260 to cause the controller 256 to effectuate raising of the header and emitter 250b can emit a light beam operable to strike the sensor guide to cause the controller to effectuate lowering of the header.

It is further contemplated that the apparatus of the subject application can include a second sensor guide 260a similar in construction and function to sensor guide 260. Such second sensor guide 260a would be spaced from the sensor guide 260 and have a fore and aft facing aperture in alignment with aperture 262 of sensor guide 260. Like sensor guide 260, the second sensor guide 260a would be in communication with controller 256 in a manner similar to sensor guide 260. The second sensor guide includes an aperture for allowing the passage of light through the aperture when the skid plate 234 is in the first position and a body for blocking the passage of the light beam when the skid plate is in the second position. Furthermore, while the foregoing emitter and receiver are aligned perpendicular to longitudinal axis A, it can alternatively be aligned at an angle, such as more or less than 45 degrees relative to axis A.

Figure 6:
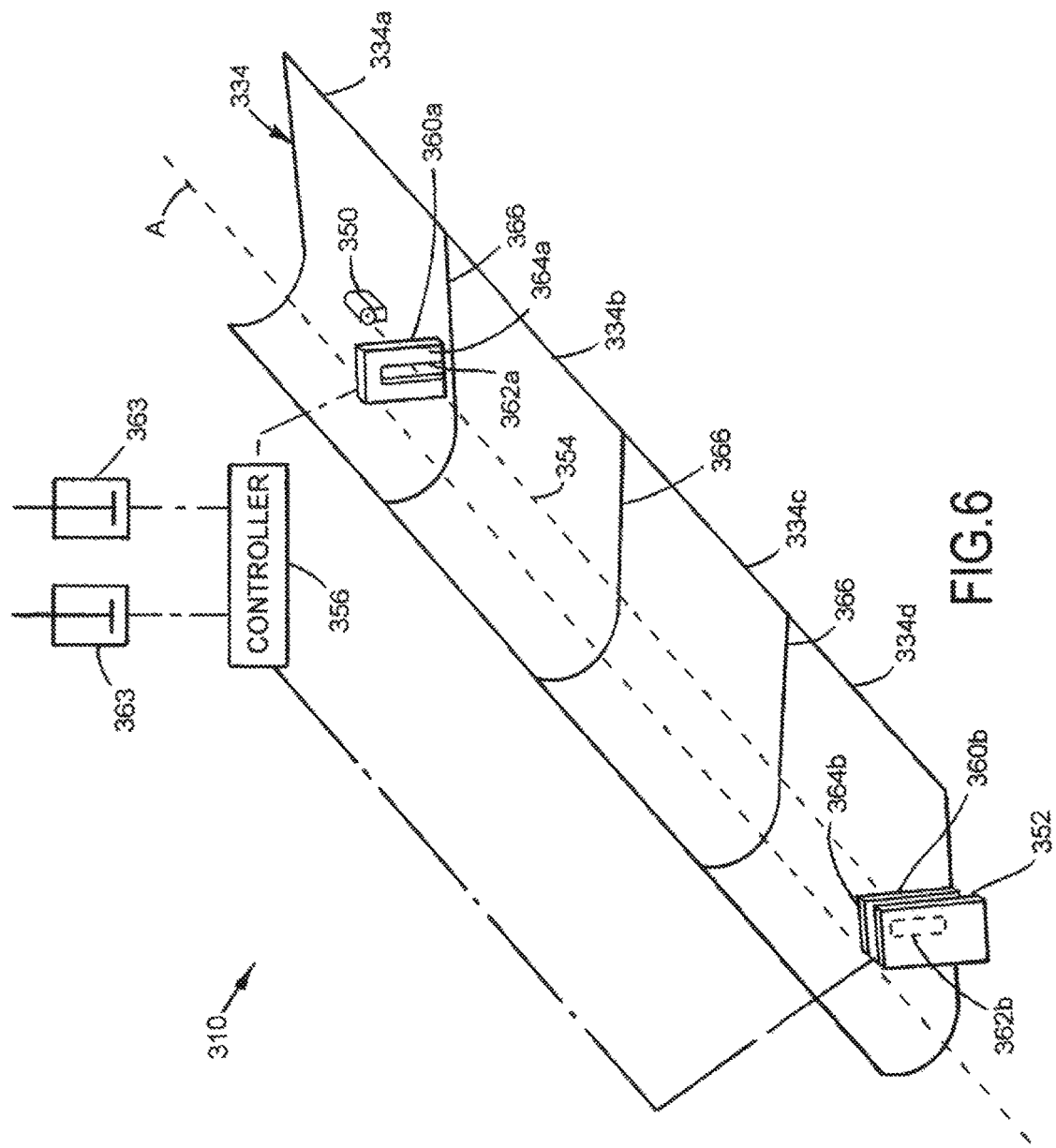
FIG. 6 is a perspective view of a portion of an agricultural harvester header in accordance with a further aspect of the subject application.

Referring to FIG. 6, there is shown a further aspect of the subject application, in particular a partial view of an agricultural harvester header 310. Skid plate 334 is constructed as a plurality of skid plate segments e.g., 334a, 334b, 334c and 334d which can be connected by flex joints 366 whereby the skid plate segments are independently moveable relative to each other. It will be understood that the size and number of skid plate segments will vary with the width of the header. For instance, a 40-foot header may include four 10-foot skid plates, although a lesser number of wider skid plates or a greater number of narrower skid plates can achieve a similar effect.

Header 310 includes a light beam emitter 350 and a receiver 352 for receiving the light beam. As illustrated, both the emitter and the receiver are mounted on the top of skid plate 334, although one or both of the emitter and receiver can alternatively be mounted on a fixed element, such as the header chassis. Disposed between the emitter and receiver is a sensor guide 360a which is similar in structure and function to sensor guide 260 discussed in connection with FIG. 5. Sensor guide 360a includes an aperture 362a for allowing the passage of a light beam 354 through the aperture when the skid plate segment 334a is in a first position and a body 364a for blocking the passage of the light beam when the skid plate segment 334a is in a second position. For example, in the first position the light beam passes through the aperture 362a and in the second position the body of the sensor guide 360a blocks the light beam from reaching the receiver. The aperture 362a faces parallel to the longitudinal axis A of the skid plate 334 and the light beam 354 is emitted substantially parallel to the longitudinal axis A.

Sensor guide 360a is in communication with a controller 356 which is configured to adjust the elevation of the header relative to the ground surface based upon a response received from the sensor guide. Based on the response received from the sensor guide, the controller 356 operates one or more extensible actuators 363 in order to adjust the height of header 310 responsive to fluctuations in ground height detected by the sensor guide as the harvester traverses afield.

Further, header 310 can include a second sensor guide 360b which is similar in construction and function to sensor guide 360a. The sensor guide 360a can be connected to a first skid plate segment 334a and the second sensor guide 360b can be connected to a second skid plate segment such as skid plate segment 334d. The second sensor guide 360b includes an aperture 362b that faces in a widthwise direction of the header, i.e., parallel to the longitudinal axis of the skid plate 334, in alignment with aperture 362a of sensor guide 360a. Thus, the sensor guide 360a and the second sensor guide 360b are connected to the skid plate with their respective apertures aligned and facing in the widthwise direction of the header. The second sensor guide 360b includes a body 364b for blocking passage of the light beam to the receiver when the skid plate segment 334d is in a second position. Sensor guide 360b similarly communicates with controller 356 in the manner described above in connection with sensor guide 360a. Thus, the sensor guide 360a and second sensor guide 360b allow passage of the light beam through their respective apertures when the skid plate 334 is in the first position and either or both of their bodies block passage of the light beam when the skid plate is in the second position. Accordingly, when either or both of sensor guides 360a, 360b is detected as being in a light blocking position, controller 356 senses such condition and directs the one or more extensible actuators to raise, lower, or tilt the header chassis as may be appropriate to accommodate the detected change in ground surface topography.

Although not illustrated, it is contemplated that header 310 can include a second emitter similar in construction and function to emitter 350 which, in combination with emitter 350, functions in the manner of emitters 250a, 250b of FIG. 5. In addition, it will be understood that a sensor guide can be mounted to each skid plate segment, every second skid plate segment, every third skid plate segment, and so on. Moreover, although illustrated as being a single controller in the accompanying drawings, it is contemplated that the controller 256 or 356 can instead comprise more than one controller each of which would be in communication with a separate sensor guide.

Figure 7:
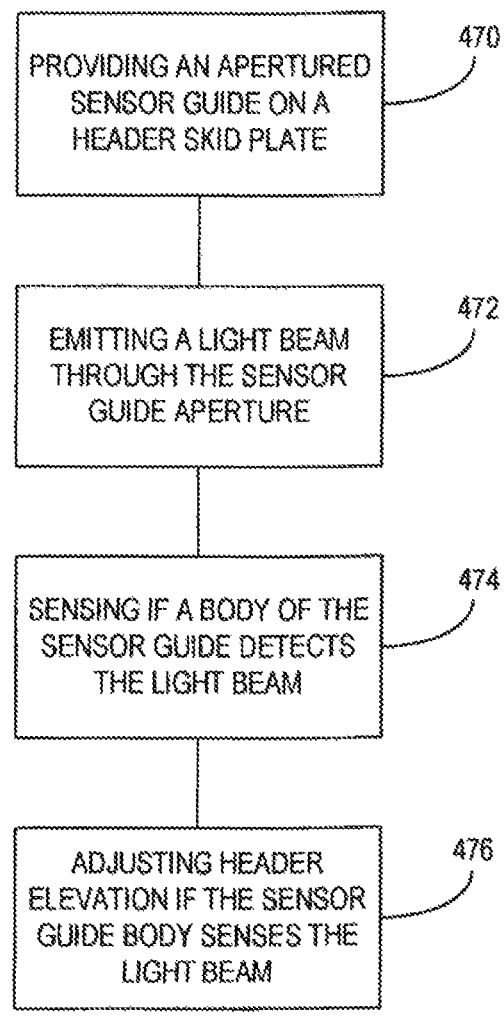
FIG. 7 is a flow chart schematically depicting an improved header height control method in accordance with an aspect of the subject application.

Referring to FIG. 7 and in accordance with a further aspect, the subject application provides effective methods for controlling a distance between a front end of a header of an agricultural harvester and a ground surface. In general, such methods involve providing a suitable sensor guide on a header skid plate (act 470) such as sensor guide 360a described above. More specifically, the sensor guide can include a body and an aperture through the body for mounting on a skid plate connected adjacent the front end of a header, as described in more detail in the above aspects of the subject application. Once the appropriate sensor guide is selected and properly positioned, an emitter is used to emit a light beam adjacent to the skid plate for passage through the aperture of the sensor guide when the skid plate is in a non-biased position (act 472). Depending on the orientation of the sensor guide the light beam can be emitted either substantially parallel to or substantially perpendicular to the longitudinal axis of the skid plate, as discussed in detail in the above aspects of the subject application. Using e.g., a light receiver, the body of the sensor guide senses or detects the presence of the light beam when the skid plate is biased as the harvester travels along the ground surface (act 474). That is, the sensor guide uses a light receiver to determine whether the body of the sensor guide blocks the emitted light beam from reaching the light receiver when the skid plate is in a biased position. Then, when it is sensed that the sensor guide detects the presence of a light beam, the elevation of the header is adjusted to accommodate changes in ground surface topography (act 476). For example, if the sensor guide body senses the presence of the light beam as the harvester travels along the ground surface, a controller operates one or more extensible actuators to raise, lower or tilt the header as changes in ground elevation may warrant.

It will be appreciated by those skilled in the art that changes could be made to the aspects described above without departing from the broad inventive concept thereof. It is to be understood, therefore, that the subject application is not limited to the particular aspects disclosed, but it is intended to cover modifications within the spirit and scope of the subject application as defined by the appended claims.

We claim:

1. An apparatus for controlling a distance between a front end of a header of an agricultural harvester and a ground surface comprising:
   an emitter that emits a light beam adjacent to a skid plate mounted on a header chassis and disposed adjacent to a cutter bar assembly carried by the header chassis, the skid plate extending in a widthwise direction of the header chassis defining a longitudinal axis and moveable between a first position and a second position relative to the header chassis;
   a sensor guide directly connected to the skid plate, the sensor guide having an aperture that allows passage of the light beam through the aperture when the skid plate is in the first position and a body that blocks the passage of the light beam when the skid plate is in the second position; and
   a controller in communication with the sensor guide and configured to adjust the elevation of the header relative to the ground surface based upon a response received from the sensor guide.

2. The apparatus of claim 1, further comprising a second sensor guide having an aperture that allows the passage of the light beam through the aperture when the skid plate is in the first position and a body that blocks the passage of the light beam when the skid plate is in the second position, wherein the sensor guide and second sensor guide are connected to the skid plate and aligned in the widthwise direction of the header.

3. The apparatus of claim 2, wherein the skid plate comprises a plurality of skid plate segments each independently moveable relative to each other and the sensor guide is connected to a first skid plate segment and the second sensor guide is connected to a second skid plate segment.

4. The apparatus of claim 1, wherein the emitter emits the light beam adjacent to the skid plate substantially perpendicular or substantially parallel to the longitudinal axis.

5. The apparatus of claim 1, wherein the skid plate comprises a plurality of skid plate segments each independently moveable relative to each other.

6. The apparatus of claim 1, further comprising a receiver that receives the light beam passing through the aperture of the sensor guide.

7. A header for an agricultural harvester comprising:
   a header chassis mountable on a harvester;

a front end of the header carried by the header chassis;

a skid plate mounted on the header chassis and disposed adjacent to the front end, the skid plate extending in a widthwise direction of the header chassis defining a longitudinal axis extending in the widthwise direction of the header, and wherein the skid plate is moveable between a first position and a second position relative to the header chassis;

an emitter that emits a light beam adjacent to the skid plate;

a sensor guide directly connected to the skid plate, the sensor guide having an aperture that allows passage of the light beam through the aperture when the skid plate is in the first position and blocks the passage of the light beam when the skid plate is in the second position; and a controller in communication with the sensor guide and configured to adjust the elevation of the header relative to a ground surface based upon a response received from the sensor guide.

8. The header of claim 7, further comprising a second emitter that emits a second light beam through the sensor guide for receipt by a receiver.

9. The header of claim 7, further comprising a second sensor guide having an aperture that allows passage of the light beam through the aperture when the skid plate is in the first position and a body that blocks the passage of the light beam when the skid plate is in the second position, wherein the sensor guide and the second sensor guide each have their respective apertures facing in the widthwise direction of the header.

10. The header of claim 7, further comprising a second sensor guide having an aperture that allows passage of the light beam through the aperture when the skid plate is in the first position and a body that blocks the passage of the light beam when the skid plate is in the second position, wherein the sensor guide and the second sensor guide each have their respective apertures facing in a fore and aft direction of the header.

11. The header of claim 7, further comprising a second emitter and a second sensor guide, the second sensor guide having an aperture that allows the passage of the light beam through the aperture when the skid plate is in the first position and a body that blocks the passage of the light beam when the skid plate is in the second position.

12. The header of claim 7, wherein the skid plate comprises a plurality of skid plate segments independently moveable relative to each other.

13. The header of claim 12, wherein the sensor guide is connected to a first skid plate segment, and wherein the apparatus further comprises a second sensor guide connected to a second skid plate segment, wherein the second sensor guide includes an aperture that allows passage of the light beam through the aperture when the second skid plate segment is in the first position and a body that blocks the passage of the light beam when the second skid plate segment is in the second position.

14. The header of claim 13, further comprising a second emitter for emitting a second light beam through at least one of the sensor guide and the second sensor guide.

15. The header of claim 7, further comprising a receiver that receives the light beam passing through the aperture of the sensor guide.

16. A method for controlling a distance between a front end of a header of an agricultural harvester and a ground surface comprising:

mounting a sensor guide directly on a skid plate connected adjacent the front end of the header;

emitting a light beam adjacent to the skid plate for passage through an aperture of the sensor guide when the skid plate is in a non-biased position;

sensing whether the sensor guide detects the presence of the light beam when the skid plate is biased as the harvester travels along the ground surface; and adjusting the elevation of the header in response to the sensor guide sensing the presence of the light beam as the harvester travels along the ground surface.

17. The method of claim 16, wherein the emitting act comprises emitting the light beam substantially perpendicular or substantially parallel to a longitudinal axis of the skid plate.

18. A header for an agricultural harvester comprising:

a header chassis mountable on a harvester;

a cutter bar assembly carried by the header chassis;

a skid plate mounted on the header chassis and disposed adjacent to the cutter bar assembly, the skid plate extending in a widthwise direction of the header chassis defining a longitudinal axis substantially parallel to a longitudinal axis of the header chassis and moveable between a first position and a second position relative to the header chassis;

a support bar having a first end pivotably connected to the header chassis and a second end opposite the first end connected to the skid plate;

an emitter, mounted on the chassis proximate the first end of the support bar, that emits a light beam adjacent to the support bar;

a receiver, mounted on the support bar proximate the second end, receiving the light beam; and a controller in communication with the receiver and configured to adjust the elevation of the header relative to a ground surface based upon a response received from the receiver.

19. The header of claim 18, wherein the emitter emits the light beam adjacent to and substantially parallel to a longitudinal axis of the support bar or the longitudinal axis of the skid plate.

20. The apparatus of claim 1, wherein the light beam comprises a laser light beam.

21. The apparatus of claim 1, wherein the controller is further configured to adjust the tilt of the header relative to the ground surface based upon the response received from the sensor guide.

22. The header of claim 7, wherein the light beam comprises a laser light beam, and the controller is further configured to adjust the tilt of the header relative to the ground surface based upon the response received from the sensor guide.

23. The method of claim 16, further comprising adjusting the tilt of the header in response to the sensor guide body sensing the presence of the light beam as the harvester travels along the ground surface, wherein the light beam comprises a laser light beam.

24. The header of claim 18, wherein the light beam comprises a laser light beam, and the controller is further configured to adjust the tilt of the header relative to the ground surface based upon a response received from the receiver.

* * * * *